US012670132B2

(12) United States Patent
Sun et al.

(10) Patent No.: US 12,670,132 B2
(45) Date of Patent: Jun. 30, 2026

(54) CARDINALITY ESTIMATION METHOD AND APPARATUS

(71) Applicant: HUAWEI TECHNOLOGIES CO., LTD., Shenzhen (CN)

(72) Inventors: Ji Sun, Beijing (CN); Shifu Li, Beijing (CN); Shujie Zhang, Shenzhen (CN); Guoliang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/900,853

(22) Filed: Sep. 29, 2024

(65) Prior Publication Data

US 2025/0021531 A1 Jan. 16, 2025

Related U.S. Application Data

(63) Continuation of application No. PCT/CN2023/075191, filed on Feb. 9, 2023.

(30) Foreign Application Priority Data

Mar. 31, 2022 (CN) .......................... 202210334793.5

(51) Int. Cl.
G06F 16/21 (2019.01)
G06F 16/22 (2019.01)
G06N 5/022 (2023.01)

(52) U.S. Cl.
CPC ........... *G06F 16/211* (2019.01); *G06N 5/022* (2013.01)

(58) Field of Classification Search
CPC .............. G06F 16/211; G06F 16/2453; G06F 16/2433; G06N 5/022
(Continued)

(56) References Cited

U.S. PATENT DOCUMENTS

2004/0128287 A1* 7/2004 Keller ............... G06F 16/24545
2007/0143246 A1* 6/2007 Bestgen ............ G06F 16/24524
(Continued)

FOREIGN PATENT DOCUMENTS

CN 102930003 A 2/2013
CN 103544258 A 1/2014
(Continued)

OTHER PUBLICATIONS

Davitkova Angjela et al: "LMKG: Learned Models for Cardinality Estimation in Knowledge Graphs", arXiv, Feb. 1, 2021 (Feb. 1, 2021), total 12 pages.
(Continued)

*Primary Examiner* — Kuen S Lu

(57) ABSTRACT

A cardinality estimation method and an apparatus are provided. The method includes: selecting a target model type from a plurality of model types based on a target distribution feature and mapping relationship information, where the mapping relationship information includes a mapping relationship between the plurality of model types and a predicted distribution feature, and the target distribution feature is extracted from sample data collected based on an analysis instruction; and obtaining, based on the target model type, a target model corresponding to the target model type, where the target model is used to perform cardinality estimation on a query instruction of a database.

18 Claims, 3 Drawing Sheets

S101

Perform sampling based on a column in an analysis instruction, to obtain sample data

S102

Obtain, in a database, a cardinality estimation model based on the sample data and a target distribution feature extracted from the sample data

S103

Perform cardinality estimation on a query condition in a query instruction by using the cardinality estimation model, where an obtained cardinality indicates an estimated quantity of rows of an execution result of the query instruction

(58) Field of Classification Search
USPC ........................................................... 707/756
See application file for complete search history.

(56) References Cited

U.S. PATENT DOCUMENTS

| | | | |
|---|---|---|---|
| 2009/0077054 A1* | 3/2009 | Muras | G06F 16/24542 |
| | | | 707/999.005 |
| 2017/0193561 A1* | 7/2017 | Shen | G06Q 30/0275 |
| 2017/0255751 A1* | 9/2017 | Sanmugalingham | |
| | | | G06F 21/6254 |
| 2018/0096006 A1* | 4/2018 | Das | G06F 16/221 |
| 2018/0300650 A1* | 10/2018 | Gebremariam | G06F 7/02 |
| 2021/0012199 A1* | 1/2021 | Zhang | G06N 7/01 |
| 2021/0150705 A1* | 5/2021 | Feng | G06T 5/60 |
| 2022/0067045 A1* | 3/2022 | Kalil | G06F 16/24545 |
| 2022/0091873 A1* | 3/2022 | Skvortsov | G06Q 30/0201 |

FOREIGN PATENT DOCUMENTS

| | | | |
|---|---|---|---|
| CN | 110888859 A | | 3/2020 |
| CN | 114153874 A | | 3/2022 |
| CN | 109948036 B | * | 10/2022 |
| WO | WO-2025130336 A1 | * | 6/2025 ......... G06F 16/2455 |

OTHER PUBLICATIONS

Sun Ji et al: "Learned cardinality estimation: a design space exploration and a comparative evaluation", Proceedings of the VLDB Endowment, Sep. 1, 2021, pp. 85-97.

Zhang Jintao et al: "AutoCE: An Accurateand Efficient Model Advisor for LearnedCardinality Estimation", 2023 IEEE 39th International Conference Ondata Engineering (ICDE), Apr. 3, 2023, pp. 2621-2633.

Ziniu Wu et al:"BayesCard: Revitalizing Bayesian Networks for Cardinality Estimation."arXiv:2012.14743v2 [cs. DB] Feb. 2, 2021. total 16 pages.

Ji Sun et al:"An End-to-End Learning-based Cost Estimator. "arXiv:1906.02560v1 [cs.DB] Jun. 6, 2019. total 13 pages.

Ji Sun et al:"Learned Cardinality Estimation: A Design Space Exploration and A Comparative Evaluation."Sep. 1, 2021, total 13 pages.

Ji Sun et al:"Learned Cardinality Estimation for Similarity Qeries. "Jun. 18, 2021, total 13 pages.

IBM et al., "Machine Learning Optimizer Technology Preview for Db2 11.5.4 and 11.5.5", Nov. 18, 2020, total:8pages.

IBM et al., "Db2 Machine Learning Optimizer Technology Preview", Jun. 4, 2020,total:11pages.

* cited by examiner

S101

Perform sampling based on a column in an analysis instruction, to obtain sample data

S102

Obtain, in a database, a cardinality estimation model based on the sample data and a target distribution feature extracted from the sample data

S103

Perform cardinality estimation on a query condition in a query instruction by using the cardinality estimation model, where an obtained cardinality indicates an estimated quantity of rows of an execution result of the query instruction

Select a target model type from a plurality of model types based on a target distribution feature and mapping relationship information, where the mapping relationship includes a mapping relationship between the plurality of model types and a predicted distribution feature, and the target distribution feature is extracted from sample data collected based on an analysis instruction

S202

Obtain, based on the target model type, a target model corresponding to the target model type, where the target model is used to perform cardinality estimation on a query instruction of a database

FIG. 4

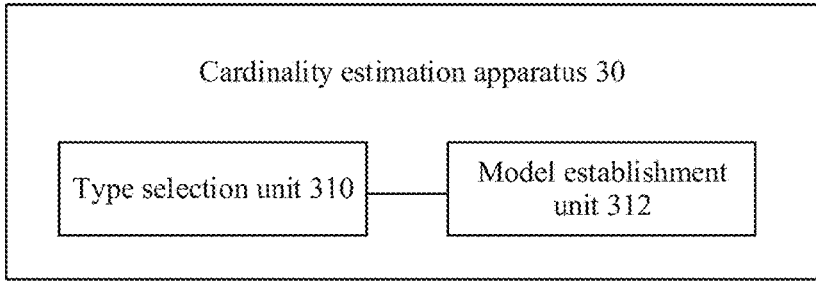

Cardinality estimation apparatus 30

Type selection unit 310 — Model establishment unit 312

FIG. 5

CARDINALITY ESTIMATION METHOD AND APPARATUS

CROSS-REFERENCE TO RELATED APPLICATIONS

This application is a continuation of International Application No. PCT/CN2023/075191, filed on Feb. 9, 2023, which claims priority to Chinese Patent Application No. 202210334793.5, filed on Mar. 31, 2022. The disclosures of the aforementioned applications are hereby incorporated by reference in their entireties.

TECHNICAL FIELD

This application relates to the database field, and in particular, to a cardinality estimation method and an apparatus.

BACKGROUND

A cardinality estimation technology is widely used in a database, and is a technology for pre-estimating a quantity of result rows of a query instruction or a query statement before execution. Based on a cardinality estimated for the query instruction, costs of an execution plan of the query instruction can be estimated and an optimal execution plan can be selected. This helps improve execution efficiency of the query instruction, and plays an important role in improving overall performance of the database. However, a current cardinality estimation method has low accuracy for cardinality estimation.

SUMMARY

This application discloses a cardinality estimation method and an apparatus, to accurately construct a model used for cardinality estimation. This improves cardinality estimation efficiency and precision.

According to a first aspect, this application provides a cardinality estimation method, where the method includes: selecting a target model type from a plurality of model types based on a target distribution feature and mapping relationship information, where the mapping relationship information includes a mapping relationship between the plurality of model types and a predicted distribution feature, and the target distribution feature is extracted from sample data collected based on an analysis instruction; and obtaining, based on the target model type, a target model corresponding to the target model type, where the target model is used to perform cardinality estimation on a query instruction of a database.

The method is applied to a first device. The first device may be, for example, a server deployed on a network side, or a component or a chip in the server. For example, the first device may be deployed in a cloud environment, or the first device may be deployed in an edge environment. The first device may be one integrated device, or may be a plurality of distributed devices. This is not specifically limited herein.

The analysis instruction is used to collect statistical information related to data table content in the database, for example, a plurality of columns of data. The analysis instruction may be an Analyze command of the database. The database may be a structured query language (SQL) database, a MySQL database, an Oracle database, or another database.

Herein, the predicted distribution feature includes distribution features corresponding to a plurality of analysis instructions. For example, a distribution feature corresponding to a first analysis instruction is extracted from first sample data collected based on the first analysis instruction. An analysis instruction corresponding to the target distribution feature may be included in the plurality of analysis instructions, or may not be included in the plurality of analysis instructions.

In an implementation, different analysis instructions correspond to different target models. The different target models mean that target models are of different types, or target models are of a same type but have different model parameters. The different analysis instructions mean that quantities of columns in two analysis instructions are different, or identifiers of columns in two analysis instructions are different, or quantities of columns in two analysis instructions are different and identifiers of the columns are also different.

In an implementation, same analysis instructions received at different moments may correspond to different target models. The same analysis instructions may be sent by different clients at different moments, or may be sent by a same client at different moments. Although the same analysis instructions are received, sample data collected twice may be different because the same analysis instructions occur at different moments. For example, the different sample data collected twice may be caused by a change of a historical query record and/or a change of a data table. Further, extracted distribution features may also be different. Therefore, the finally obtained target model may also be different. It may be understood that when a target model corresponding to a same analysis instruction changes, the first device may correspondingly update, in a memory and/or a disk, related information (for example, a model parameter) of a latest target model corresponding to the analysis instruction.

In the foregoing method, the target model type suitable for the distribution feature is selected from the plurality of model types based on the distribution feature extracted from the sample data. A plurality of model types applicable to a plurality of application scenarios are provided, to implement adaptive selection of a model type under different distribution features. Accuracy of the target model used for cardinality estimation is improved, and accuracy of cardinality estimation is improved.

Optionally, the obtaining, based on the target model type, a target model corresponding to the target model type includes: obtaining, based on the target model type and the sample data, the target model corresponding to the target model type.

In the foregoing implementation, obtaining of the target model is not only related to the target model type, but also related to the sample data. This implements precise construction of the target model.

Optionally, operators corresponding to the plurality of model types are set in the database, and the obtaining, based on the target model type and the sample data, the target model corresponding to the target model type includes: determining, from the operators corresponding to the plurality of model types, an operator corresponding to the target model type; creating, by using the operator corresponding to the target model type, an untrained model corresponding to the target model type; and training the untrained model based on the sample data, to obtain the target model corresponding to the target model type.

An operator corresponding to each of the plurality of model types is a minimum computing unit in the database.

In other words, it is set in the database that each model type has an operator corresponding to the model type. For example, when the model type is a Bayesian network, an operator corresponding to the model type is a Bayesian network operator, and a model corresponding to the model type is a Bayesian network model. For example, when the model type is a Gaussian kernel function, an operator corresponding to the model type is a Gaussian kernel function operator, and a model corresponding to the model type is a Gaussian kernel function model.

For example, an operator corresponding to each model type may also be referred to as a machine learning operator. An operator corresponding to any one of the plurality of model types has at least one of the following features:

an operator corresponding to the model type is a native node in an execution plan of the database;

the operator corresponding to the model type may be optimized with reference to an optimizer in the database; and the operator corresponding to the model type may directly access storage and data in the database.

It may be understood that the operator corresponding to the target model type also has at least one of the foregoing three features.

Herein, data used during the training of the untrained model corresponding to the target model type is related to the target model type.

For example, training, based on a part of data in the sample data, the untrained model corresponding to the target model type includes the following two cases: (1) when the target model type is any one of a Bayesian network, autoregression, and a sum-product probability, training the untrained model based on the part of data in the sample data, where the part of data in the sample data is data collected from at least one data table in the database based on the analysis instruction, that is, a plurality of columns of data corresponding to the analysis instruction, or (2) when the target model type is either of mixed uniform distribution and a Gaussian kernel function, training the untrained model based on the part of data in the sample data, where the part of data in the sample data is data collected from a historical query record based on the analysis instruction, that is, historical query instruction data corresponding to the analysis instruction.

For example, the untrained model corresponding to the target model type is trained based on all data in the sample data. In this case, the target model type may be a neural network, all the data in the sample data is data obtained through sampling from a historical query record and at least one data table in the database based on the analysis instruction.

In an implementation, the training of the untrained model corresponding to the target model type and use of the target model may occur on a same device, for example, the first device.

In the foregoing implementation, the target model used for cardinality estimation is obtained based on the sample data and the operator corresponding to the target model type in the database. This improves model construction efficiency. In addition, based on different types of target models, different data in the sample data is used to implement targeted training on the target model. This helps improve accuracy of a constructed model.

Optionally, the sample data is collected from a historical query record and at least one data table in the database based on the analysis instruction.

The historical query record includes a plurality of historical query instructions input by a user. The query instruction may be a query for a single table (or referred to as a base table), or may be a query for multi-table joins. The query instruction includes a query condition, for example, a WHERE condition in the query instruction. The query condition includes a predicate and identifier information of a column, where an identifier of the column that is in the query condition indicates a to-be-queried column, and the predicate includes at least one of like, between, is NULL/is NOT NULL, in, exists, and a comparison operator.

In the foregoing implementation, collection of column data and collection of historical query load are comprehensively considered for sample data collection. This increases diversity of sample data.

Optionally, the sample data includes a plurality of columns of data corresponding to the analysis instruction and historical query instruction data corresponding to the analysis instruction, and the target distribution feature includes a first feature and a second feature, where the first feature indicates a distribution characteristic of the plurality of columns of data, and the second feature indicates a distribution characteristic of columns in the historical query instruction data.

It may be understood that the first feature is extracted based on the plurality of columns of data corresponding to the analysis instruction, and the second feature is extracted based on the historical query instruction data corresponding to the analysis instruction.

In the foregoing implementation, when the sample data is collected, both the plurality of columns of data corresponding to the analysis instruction and the historical query instruction data corresponding to the analysis instruction are collected. In other words, collection of the column data and collection of the historical query load are comprehensively considered. This increases diversity of the sample data. Extracting the distribution feature from the obtained sample data also improves diversity of the distribution feature.

Optionally, the first feature includes at least one of the following features:

a quantity of different values in each of the plurality of columns of data;

information about correlation between columns in the plurality of columns of data; and a quantity of columns in the plurality of columns of data.

The information about the correlation between the columns in the plurality of columns of data includes at least one of the following: an average value of coefficients of the correlation between the columns in the plurality of columns of data or a maximum value of the coefficients of the correlation between the columns in the plurality of columns of data.

The features such as the quantity of different values in each column, information about correlation between the columns, and the quantity of columns in the plurality of columns of data are extracted, so that the distribution characteristic of the plurality of columns of data is represented from a plurality of dimensions. In addition, in a scenario in which distribution skew or high correlation occurs in the plurality of columns of data, these features can also accurately represent the distribution characteristic of the plurality of columns of data.

Optionally, the second feature includes at least one of the following features:

column combination coverage information in the historical query instruction data;

column query range coverage information corresponding to each historical query instruction in the historical query instruction data; and information about a column query similarity between historical query instructions in the historical query instruction data.

The column combination coverage information indicates a ratio of a quantity of existing column combinations in the historical query instruction data to a total quantity of column combinations obtained based on the columns in the analysis instruction. For example, it is assumed that there are three historical query instructions in the historical query instruction data, and column combinations corresponding to the three historical query instructions are $\{c1, c2, c3\}$, $\{c1, c2\}$, and $\{c2, c3\}$, respectively. That is, a quantity of existing column combinations in the historical query instruction data is 3. It is assumed that the analysis instruction is "Analyze $(c1, c2, c3, c4)$", and at least two columns of the columns c1, c2, c3, and c4 in the analysis instruction are combined, so that a total quantity of obtained column combinations is 11. Therefore, column combination coverage information in the historical query instruction is $3/11$.

The column query range coverage information corresponding to the historical query instruction indicates a ratio of a column query range of the historical query instruction to a total column query range corresponding to each column in the historical query instruction, and the total column query range corresponding to each column is determined based on a maximum value and a minimum value of values in each column. For example, if a query condition in a specific historical query instruction is "WHERE $1<=c1<=3$ and $1<=c2<=5$ and $2<=c3<=10$", a column query range of the historical query instruction is $2*4*8=64$. If a minimum value and a maximum value of values in each of the three columns (that is, c1, c2, and c3) are 0 and 100, respectively, a query range of each of the three columns is 0 to 100, a total column query range corresponding to the three columns is $100*100*100=10^6$, and column query range coverage information that corresponds to the historical query instruction and that is obtained through calculation is $64/10^6$.

The information about the column query similarity indicates a similarity between column query ranges in any two historical query instructions.

In the foregoing implementation, when feature extraction is performed on the historical query instruction data, a hit rate of historical query load, that is, column combination coverage, is considered, and a range query is further considered, for example, column query range coverage and similarity between column query ranges of different historical query instructions. In this way, a distribution characteristic of the historical query instruction data is represented from a plurality of dimensions.

It can be learned that the distribution feature extracted from the sample data is not only refined, but also accurate, and can accurately express a distribution characteristic of column data and a distribution characteristic of the historical query load.

Optionally, when the analysis instruction includes identifiers of a plurality of data tables in the database, a process of collecting the sample data is specifically as follows: sending sampling indication information to at least one data node, where the sampling indication information indicates the at least one data node to collect, from the plurality of data tables based on a join relationship between the plurality of data tables, data in a column in the analysis instruction; and collecting a historical query instruction that is in the historical query record and that is related to the column in the analysis instruction.

The join relationship between the plurality of data tables may be obtained via primary key information and foreign key information in each data table. A primary key of a data table is a unique identifier of a record, and a foreign key of the data table is used to associate with another data table. One data table has one primary key and at least one foreign key. The foreign key of the data table can be a primary key of another data table.

It may be understood that the plurality of columns of data corresponding to the analysis instruction in the sample data are collected by at least one data node and then sent to the first device, and the historical query instruction data corresponding to the analysis instruction in the sample data is collected by the first device.

In the foregoing implementation, data that is in each data table and that is related to a column in the analysis instruction is sequentially collected based on the join relationship between the data tables. This avoids memory explosion caused by all join results of materialization, further improves a sampling rate, and implements sampling of multi-table joins.

Optionally, the mapping relationship information is obtained through training according to an artificial intelligence algorithm.

For example, the artificial intelligence algorithm may be a decision tree (Decision Tree), a random forest (Random Forest, RF), a support vector machine (SVM), or another classification algorithm. This is not specifically limited herein.

In an implementation, a device for using the artificial intelligence algorithm and a device for training the artificial intelligence algorithm may be different devices. For example, the device for using the artificial intelligence algorithm is the first device, and the device for training the artificial intelligence algorithm is another device independent of the first device.

When training and use of the artificial intelligence algorithm occur on different devices, it also indicates that obtaining the mapping relationship information through training of the artificial intelligence algorithm and determining the target model type via the mapping relationship information do not simultaneously occur. Generally, the mapping relationship information is first obtained through training, and then the target model type is determined via the mapping relationship information. In this way, another training device undertakes a task of obtaining the mapping relationship information through training, so that load of the first device can be reduced.

In another implementation, training and use of the artificial intelligence algorithm may alternatively occur on a same device. For example, both training and use of the artificial intelligence algorithm occur on the first device.

Optionally, a model parameter of the target model is stored in a memory and/or a disk.

When the model parameter of the target model is stored to the disk, serialization processing needs to be performed first, to unify the model parameter into a format that can be persistently stored. Therefore, when the model parameter of the target model is read from the disk, deserialization processing further needs to be performed on the read model parameter to restore an original format of the model parameter of the target model.

In an implementation, after the first device performs cardinality estimation to read the model parameter of the target model from the disk, the first device may further store the model parameter of the target model in the memory, so that the model parameter of the target model can be directly obtained from the memory when the same model parameter of the target model is read next time. In this way, frequent deserialization operations caused by reading the model parameter from the disk are avoided, and this is equivalent to implementing pre-reading of the model parameter. Efficiency of reading the target model parameter is effectively improved.

In another implementation, because memory space is limited, a quantity of target models that store model parameters in the memory is also limited. It is possible that the current memory is full, but the model parameter of the to-be-called target model is not stored in the memory. To improve efficiency of reading the model parameter of the target model, in actual use, model parameters of some target models in the memory may be deleted periodically or when the memory is full. For example, the deleted target model meets: Duration of an interval between a time of last accessing the model parameter of the target model and a current time is greater than preset duration. In this way, the model parameter of the to-be-called target model can be directly obtained from the memory as much as possible, or the model parameter of the to-be-called target model can be further stored in the memory after being read from the disk.

Optionally, the plurality of model types include at least two of the following types: a Bayesian network, autoregression, mixed uniform distribution, a Gaussian kernel function, a sum-product probability, and a neural network.

The foregoing implementations are implemented to provide the plurality of model types for selection, enrich application scenarios of cardinality estimation, and improve efficiency and accuracy of cardinality estimation.

According to a second aspect, this application provides a cardinality estimation apparatus, where the apparatus includes: a type selection unit, configured to select a target model type from a plurality of model types based on a target distribution feature and mapping relationship information, where the mapping relationship information includes a mapping relationship between the plurality of model types and a predicted distribution feature, and the target distribution feature is extracted from sample data collected based on an analysis instruction; and a model establishment unit, configured to obtain, based on the target model type, a target model corresponding to the target model type, where the target model is used to perform cardinality estimation on a query instruction of a database.

Optionally, the model establishment unit is specifically configured to obtain, based on the target model type and the sample data, the target model corresponding to the target model type.

Optionally, the model establishment unit is specifically configured to: determine, from the operators corresponding to the plurality of model types, an operator corresponding to the target model type; create, by using the operator corresponding to the target model type, an untrained model corresponding to the target model type; and train the untrained model based on the sample data, to obtain the target model corresponding to the target model type.

Optionally, the sample data is collected from a historical query record and at least one data table in the database based on the analysis instruction.

Optionally, the sample data includes a plurality of columns of data corresponding to the analysis instruction and historical query instruction data corresponding to the analysis instruction, and the target distribution feature includes a first feature and a second feature, where the first feature indicates a distribution characteristic of the plurality of columns of data, and the second feature indicates a distribution characteristic of columns in the historical query instruction data.

Optionally, the first feature includes at least one of the following features:
a quantity of different values in each of the plurality of columns of data;
information about correlation between columns in the plurality of columns of data; and
a quantity of columns in the plurality of columns of data.

Optionally, the second feature includes at least one of the following features:
column combination coverage information in the historical query instruction data;
column query range coverage information corresponding to each historical query instruction in the historical query instruction data; and
information about a column query similarity between historical query instructions in the historical query instruction data.

Optionally, the apparatus further includes a data collection unit, and when the analysis instruction includes identifiers of a plurality of data tables in the database, the data collection unit is specifically configured to: send sampling indication information to at least one data node, where the sampling indication information indicates the at least one data node to collect, from the plurality of data tables based on a join relationship between the plurality of data tables, data in a column in the analysis instruction; and collect a historical query instruction that is in the historical query record and that is related to the column in the analysis instruction.

Optionally, the mapping relationship information is obtained through training according to an artificial intelligence algorithm.

Optionally, a model parameter of the target model is stored in a memory and/or a disk.

Optionally, the plurality of model types include at least two of the following types: a Bayesian network, autoregression, mixed uniform distribution, a Gaussian kernel function, a sum-product probability, and a neural network.

According to a third aspect, this application provides an apparatus. The apparatus includes a processor and a memory, where the memory is configured to store program instructions, and the processor invokes the program instructions in the memory, so that the apparatus performs the method according to the first aspect or any possible implementation of the first aspect.

According to a fourth aspect, this application provides a computer-readable storage medium, including computer instructions. When the computer instructions are run by a processor, the method according to the first aspect or any possible implementation of the first aspect is implemented.

According to a fifth aspect, this application provides a computer program product. When the computer program product is executed by a processor, the method according to the first aspect or any possible embodiment of the first aspect is implemented. For example, the computer program product may be a software installation package. When the method provided in any possible design of the first aspect needs to be used, the computer program product may be downloaded and executed on the processor, to implement the method according to the first aspect or any possible embodiment of the first aspect.

Technical effects of the second aspect to the fifth aspect are the same as those of the first aspect. Details are not described herein.

BRIEF DESCRIPTION OF DRAWINGS

FIG. 3 is a flowchart of a cardinality estimation method according to an embodiment of this application;

FIG. 4 is a flowchart of another cardinality estimation method according to an embodiment of this application;

FIG. 5 is a diagram of a structure of a cardinality estimation apparatus according to an embodiment of this application.

DESCRIPTION OF EMBODIMENTS

Figure 1:
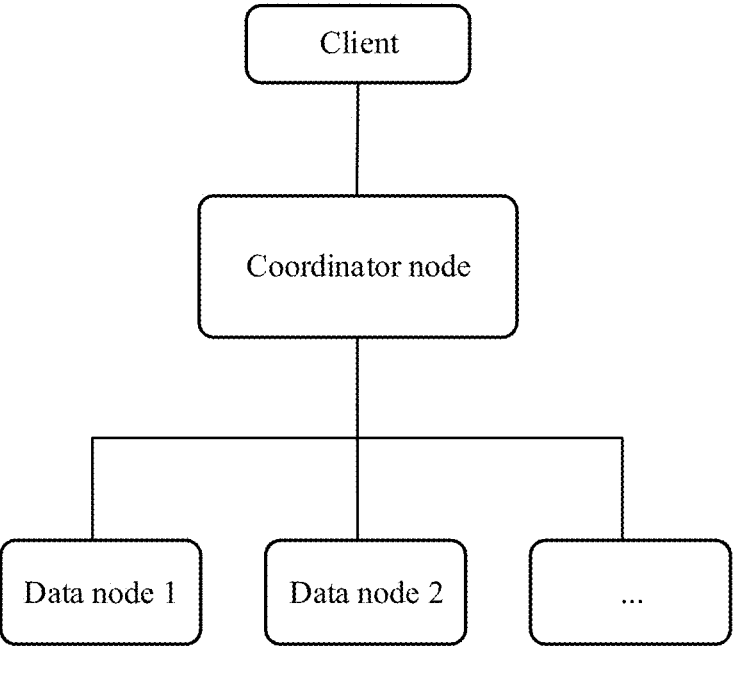
FIG. 1 is a diagram of an architecture of a system according to an embodiment of this application.

Terms used in embodiments of this application are merely intended to describe specific embodiments, but are not intended to limit this application. In this specification and the claims in embodiments of this application, terms such as "first", "second", and the like are intended to distinguish between different objects but do not indicate a particular order of the objects.

It should be noted that, in this application, prefix words such as "first" and "second" are used only to distinguish between different described objects, and do not constitute any limitation on locations, a sequence, priorities, a quantity, content, or the like of the described objects. In addition, objects decorated by different prefix words may be the same or different. For example, if a described object is a "device", a "first device" and a "second device" may be a same device, devices of a same type, or devices of different types. For another example, if a described object is "information", "first information" and "second information" may be information of same content or information of different content. In conclusion, use of the prefix words used to distinguish between the described objects in embodiments of this application does not constitute a limitation on the described objects. For descriptions of the described objects, refer to the context descriptions in the claims or embodiments, and use of the prefix words should not constitute a redundant limitation.

It should be noted that, in embodiments of this application, a description manner like "at least one (or at least one piece) of a1, a2, . . . , and an" is used, including a case in which any one of a1, a2, . . . , and an exists alone, and also including a case of any combination of a1, a2, . . . , and an. Each case may exist alone. For example, a description manner of "at least one of a, b, and c" includes a case of a single a, a single b, a single c, a combination of a and b, a combination of a and c, a combination of b and c, or a combination of a, b, and c.

To improve query performance of a database, before a query instruction sent by a client is executed, cardinality estimation is usually performed on the query instruction according to a cardinality estimation method, to select an execution plan with minimum costs from a plurality of execution plans of the query instruction. This improves execution efficiency of the query instruction and query performance of the database.

Generally, a specific process of cardinality estimation is as follows: After monitoring an analysis instruction sent by the client, a coordinator node of the database creates a statistical information analysis thread (or an analyzer for short), where the analysis instruction includes identifiers of columns, and all the columns in the analysis instruction belong to a same data table (that is, a base table); the analyzer samples the base table based on the columns in the analysis instruction, to obtain column data corresponding to the columns in the analysis instruction, and analyzes the column data to obtain simple statistical information, for example, when a high-frequency value statistics operation is performed on the column data, the simple statistical information includes a high-frequency value in the column data, or when correlation analysis is performed on the column data, the simple statistical information includes a coefficient of correlation between columns in the column data. Then, the coordinator node receives the query instruction sent by the client, generates a plurality of execution plans according to the query instruction, performs cardinality estimation on each of the plurality of execution plans. An execution plan 1 is used as an example. The coordinator node determines simple statistical information corresponding to an analysis instruction that matches the execution plan 1, and performs cardinality estimation on the execution plan 1 based on the simple statistical information matched by the execution plan 1. A cardinality estimation result of each of the plurality of execution plans may be used to select an optimal execution plan from the plurality of execution plans, so that the coordinator node may execute the query instruction based on the optimal execution plan. It can be learned that the simple statistical information used for cardinality estimation is coarse-grained and single, and is limited in application scenarios. For example, only multi-column cardinality estimation of the base table can be implemented, and accuracy of the estimated cardinality is also low.

For the foregoing problem, embodiments of this application provide a cardinality estimation method, to not only improve accuracy of cardinality estimation, but also help improve efficiency of cardinality estimation.

The following describes technical solutions of this application with reference to accompanying drawings.

FIG. 1 is a diagram of an example of an architecture of a system. The system is used for cardinality estimation. As shown in FIG. 1, the system includes at least a client, a coordinator node, and a data node. The client is connected to the coordinator node in a wired or wireless manner, and the coordinator node is connected to the data node in a wired manner.

The client is configured to send an analysis instruction to the coordinator node, where the analysis instruction includes identifiers of a plurality of columns. For example, the analysis instruction is an Analyze command. The data node serves as a physical storage node of user data, and the data node includes at least one node (for example, a data node 1 and a data node 2 in FIG. 1). The data node stores data in a database, for example, a data table. The data node may manage and operate, according to an instruction of the coordinator node, data stored in the data node. For example, the data node may collect, from at least one data table stored in the data node based on sampling indication information received from the coordinator node, data in a column in the analysis instruction. The coordinator node is configured to perform model type selection, model creation, training, and storage in response to the analysis instruction. The coordinator node is further configured to perform cardinality estimation by using a cardinality estimation model.

The coordinator node may be, for example, a server deployed on a network side, or a component or a chip in a server. For example, the coordinator node may be deployed in a cloud environment, that is, may be a cloud computing server, or the coordinator node may be deployed in an edge environment, that is, may be an edge computing server. The coordinator node may be one integrated device, or may be a plurality of distributed devices. This is not specifically limited in embodiments of this application.

In an implementation, the coordinator node is mainly configured to: receive the analysis instruction from the client; perform sampling based on the column in the analysis instruction, to obtain sample data; and obtain, in the database, a cardinality estimation model based on the sample data and a target distribution feature extracted from the sample data. In some possible embodiments, the coordinator node may further receive a query instruction sent by the client, and perform cardinality estimation on the query instruction by using a cardinality estimation model, where an obtained cardinality indicates an estimated quantity of rows of an execution result of the query instruction.

In the foregoing system, in consideration of requirements such as efficiency, security, and stability of data transmission, a local area network or a dedicated wired network is usually used for communication between the client and the coordinator node, between the coordinator node and the data node, and between data nodes.

It should be noted that FIG. 1 is merely an example of an architectural diagram, but a quantity of network elements included in the system shown in FIG. 1 is not limited. In addition to functional entities shown in FIG. 1, another functional entity may be included in FIG. 1 although it is not shown in FIG. 1. In addition, the method provided in embodiments of this application may be applied to the system shown in FIG. 1. Certainly, the method provided in embodiments of this application may alternatively be applied to another communication system. This is not limited in embodiments of this application.

Figure 2:
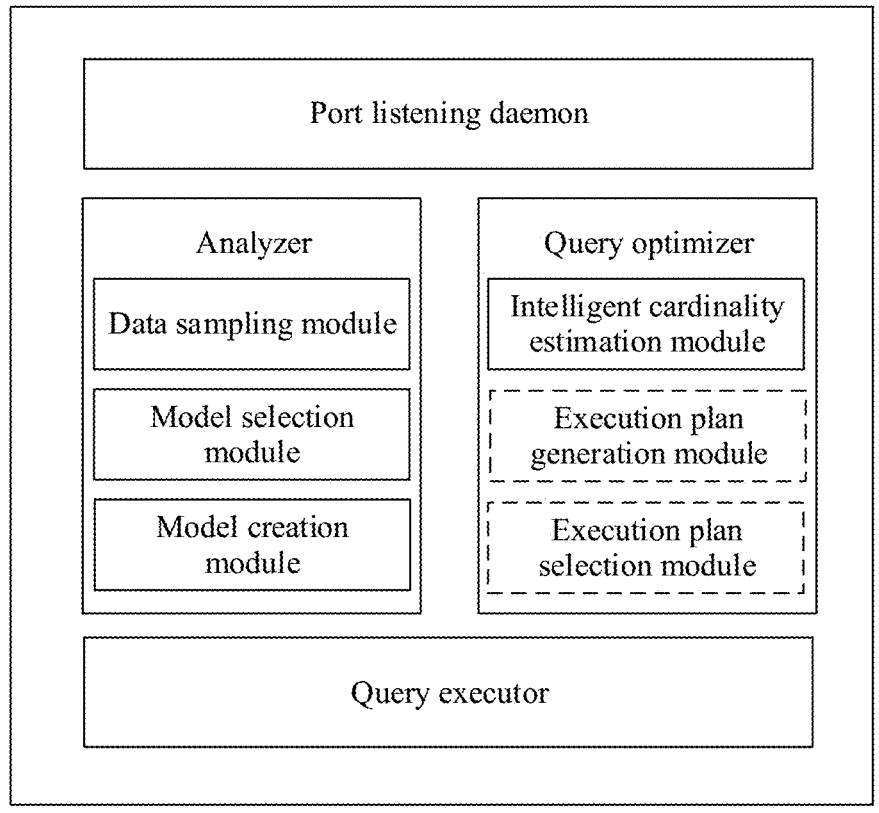
FIG. 2 is a block diagram of a coordinator node according to an embodiment of this application.

FIG. 2 is a block diagram of a coordinator node according to an embodiment of this application. In FIG. 2, the coordinator node includes a port listening daemon, an analyzer, a query optimizer, and a query executor. The port listening daemon is configured to listen for an analysis instruction (or referred to as a statistical information creation instruction), where the analysis instruction may be sent by the client in FIG. 1. The analyzer is configured to perform, in response to the analysis instruction listened and detected by the port listening daemon, sampling of sample data and type selection, model creation, training, and storage of a cardinality estimation model. The query optimizer may use the obtained cardinality estimation model to perform cardinality estimation. The query executor may provide an operator in a database for the analyzer, where the operator may be used to create a cardinality estimation model. The database may be a structured query language (SQL) database, a MySQL database, an Oracle database, or another database.

For example, the analyzer specifically includes a data sampling module, a model selection module, and a model creation module. The data sampling module is configured to obtain sample data from a historical query record and at least one data table in the database based on an analysis instruction. The model selection module is configured to extract a target distribution feature from the sample data, select a target model type from a plurality of model types based on the extracted target distribution feature. The model creation module is configured to obtain, based on the target model type, a target model corresponding to the target model type.

It should be noted that the target model is a model used for cardinality estimation, or is referred to as a cardinality estimation model.

In a process of obtaining the cardinality estimation model, the analyzer uses the operator that corresponds to the target model type in the database and that is provided by the query executor, where the operator is a minimum computing unit in the database. In this embodiment of this application, the operator is an intelligent operator newly disposed in the database. The operator is related to the target model type. For example, the operator includes but is not limited to a Bayesian network operator, an autoregressive model operator, a mixed uniform distribution model operator, a Gaussian kernel function model operator, a neural network model operator, a sum-product probability model operator, and the like.

For example, the operator corresponding to the target model type has at least one of the following features:

the operator corresponding to the target model type is a native node in an execution plan of the database;

the operator corresponding to the target model type may be optimized with reference to an optimizer in the database; and the operator corresponding to the target model type may directly access storage and data in the database.

The query optimizer includes an intelligent cardinality estimation module. The intelligent cardinality estimation module can perform cardinality estimation on a query condition in a query instruction by using the cardinality estimation model output by the model creation module in the analyzer, to obtain an estimated cardinality. In some possible embodiments, the query optimizer further includes an execution plan generation module and an execution plan selection module. The execution plan generation module is configured to generate a plurality of candidate execution plans according to the query instruction, where cardinality estimation is performed on each execution plan by the intelligent cardinality estimation module. The execution plan selection module is configured to: select an optimal execution plan from the plurality of candidate execution plans based on a cardinality estimation result of each execution plan, and output the optimal execution plan to the query executor, so that the query executor executes the query instruction based on the optimal execution plan.

It should be noted that FIG. 2 is merely an example of a block diagram of a coordinator node according to an embodiment of this application, and the coordinator node is not limited to being only in a form shown in FIG. 2. In some possible embodiments, the coordinator node may alternatively include more or fewer modules than those shown in FIG. 2. This is not specifically limited herein.

FIG. 3 is a flowchart of a cardinality estimation method according to an embodiment of this application. The method is applied to a first device. The first device may be the coordinator node in FIG. 1. For specific composition of the coordinator node, refer to related descriptions in FIG. 2. Details are not described herein. The method includes but is not limited to the following steps.

S101: Perform sampling based on a column in an analysis instruction, to obtain sample data.

In this embodiment of this application, the first device receives the analysis instruction from a client, where the analysis instruction includes identifiers of a plurality of to-be-collected columns. The identifier of the column indicates a column in a data table. The client may be the client in FIG. 1.

The analysis instruction may be an Analyze command, and the Analyze command may be used to collect statistical information related to data table content in a database, for example, a plurality of columns of data.

In some possible embodiments, the analysis instruction further includes an identifier of the data table. Whether the plurality of to-be-collected columns in the analysis instruction are included in a same data table may be determined based on a quantity of identifiers of the data tables in the analysis instruction. When the analysis instruction includes an identifier of one data table, it indicates that the plurality of columns in the analysis instruction are included in the same data table. When the analysis instruction includes identifiers of a plurality of data tables, it indicates that the plurality of columns in the analysis instruction are included in the different data tables. In this case, the analysis instruction further indicates a belonging relationship between the identifiers of the columns and the identifiers of the data tables.

For example, it is assumed that an analysis instruction 1 is Analyze(table_1 (c1, c2, c3); table_2 (c4, c5)). It can be learned that a plurality of columns in the analysis instruction include {c1, c2, c3, c4, c5}. The analysis instruction further includes identifiers of two data tables: Table 1 table_1 and Table 2 table_2. Columns c1, c2, and c3 all come from Table 1, and columns c4 and c5 both come from Table 2.

In embodiments of this application, the sample data includes a plurality of columns of data corresponding to the analysis instruction and historical query instruction data corresponding to the analysis instruction, where the plurality of columns of data corresponding to the analysis instruction include data in the columns in the analysis instruction, and the historical query instruction data corresponding to the analysis instruction includes a historical query instruction related to a column in the analysis instruction.

An analysis instruction 2 Analyze(table_1 (c1, c2); table_2 (c3, c4)) is used as an example. A plurality of columns of data corresponding to the analysis instruction are five columns of data: columns c1, c2, c3, c4, and c5. The collected historical query instruction meets the following condition: All columns in the historical query instruction are included in the columns in the analysis instruction. In this case, in the historical query instruction collected based on the columns in the analysis instruction 1, a possible column combination manner includes at least one of the following cases: {c1, c2}, {c1, c3}, {c1, c4}, {c2, c3}, {c2, c4}, {c3, c4}, {c1, c2, c3}, {c1, c2, c4}, {c2, c3, c4}, {c1, c3, c4}, and {c1, c2, c3, c4}.

A combination manner of columns in a historical query instruction 1 is specifically described by using the historical query instruction 1 as an example. It is assumed that the historical query instruction 1 is "SELECT *FROM a left join b ON a.c1=b.c1WHERE a. c2="1" and b.c3>40", where a and b are identifiers of two data tables that need to be joined, a join mode is a left join (left join), "ON a.c1=b.c1" indicates a join condition of the data tables a and b, and "WHERE a. c2="1" and b.c3>40" indicates a query condition, and specifically, indicates a query condition of an intermediate table obtained by joining the data table a and the data table b. Based on the query condition in the historical query instruction, it can be learned that a column combination manner in the historical query instruction is {c2, c3}.

In an implementation, when the analysis instruction includes only an identifier of one data table in the database, the performing sampling based on a column in an analysis instruction includes: sending first sampling indication information to at least one data node, where the first sampling indication information indicates the at least one data node to collect data in the column from the data table in which the column in the analysis instruction is located; and collecting a historical query instruction that is in a historical query record and that is related to the column in the analysis instruction.

In another implementation, when the analysis instruction includes identifiers of a plurality of data tables in the database, the performing sampling based on a column in an analysis instruction includes: sending second sampling indication information to at least one data node, where the second sampling indication information indicates the at least one data node to collect, from the plurality of data tables based on a join relationship between the plurality of data tables, data in the columns in the analysis instruction; and collecting a historical query instruction that is in a historical query record and that is related to the columns in the analysis instruction.

The join relationship between the plurality of data tables may be obtained via primary key information and foreign key information in each data table. In a relational database, a primary key of a data table is a unique identifier for determining a record, and a foreign key of the data table is used to associate with another data table. One data table has one primary key and at least one foreign key. The foreign key of the data table can be a primary key of another data table. For example, a record includes "student number-name-age", and the student number can uniquely identify a student. Therefore, the student number is a primary key, and the name and/or the age may be used as a foreign key.

For example, when the columns in the analysis instruction include the identifiers of the plurality of data tables in the database, after the at least one data node receives the second sampling indication information, if definitions of the primary key information and the foreign key information in each data table are complete, each data node may obtain the join relationship between the plurality of data tables based on the primary key information and the foreign key information in each data table, and perform step-by-step sampling on the plurality of data tables based on the join relationship between the plurality of data tables. For example, a data table is randomly selected from the plurality of data tables as a sampling start point, and related column data in the data table is collected. Then, a next data table joined to the data table is searched for based on primary key information and foreign key information, and related column data is collected from the next data table. In this manner, uniform sampling of the plurality of data tables is implemented, to improve efficiency of collecting associated data in the data tables. After the at least one data node completes collection, the at least one data node sends the data collected by the at least one data node to the first device. It should be noted that the data collected by the at least one data node is the plurality of columns of data corresponding to the analysis instruction in the sample data.

For example, a sample data sampling process is specifically described with reference to FIG. 2. For details, refer to the following A11 to A13.

A11: The analyzer is created when the port listening daemon of the coordinator node listens and detects the analysis instruction sent by the client.

A12: The data sampling module in the analyzer determines whether the analysis instruction includes the identifiers of the plurality of data tables, and when determining that the analysis instruction includes only an identifier of one data table, the data sampling module sends first sampling indication information to the at least one data node in FIG.

1, to collect data in a column in the analysis instruction in the data table, or when determining that the analysis instruction includes the identifiers of the plurality of data tables, the data sampling module sends second sampling indication information to the at least one data node in FIG. 1, to collect data in columns in the analysis instruction in the plurality of data tables. For details about the first sampling indication information and the second sampling indication information, refer to the foregoing related descriptions. Details are not described herein.

It should be noted that, after the at least one data node completes data collection, the at least one data node further returns the collected data to the coordinator node.

A13: The data sampling module in the analyzer further collects a historical query instruction that is in the historical query record and that is related to the column in the analysis instruction.

S102: Obtain, in the database, a cardinality estimation model based on the sample data and a target distribution feature extracted from the sample data.

In embodiments of this application, the sample data includes the plurality of columns of data corresponding to the analysis instruction and the historical query instruction data corresponding to the analysis instruction. The plurality of columns of data corresponding to the analysis instruction are collected by the at least one data node and then sent to the first device, and the historical query instruction data corresponding to the analysis instruction is collected by the first device.

After the sample data is obtained based on the column in the analysis instruction, the target distribution feature needs to be first extracted from the sample data. Because the sample data includes two types of data: the plurality of columns of data corresponding to the analysis instruction and the historical query instruction data corresponding to the analysis instruction, correspondingly, the target distribution feature includes a first feature and a second feature, where the first feature is extracted based on the plurality of columns of data corresponding to the analysis instruction, and the first feature indicates a distribution characteristic of the plurality of columns of data corresponding to the analysis instruction; and the second feature is extracted based on the historical query instruction data corresponding to the analysis instruction, and the second feature indicates a distribution characteristic of columns in the historical query instruction data.

The following separately describes specific content of the first feature and the second feature.

The first feature includes at least one of the following features:

(1) a quantity of different values in each of the plurality of columns of data;

(2) information about correlation between columns in the plurality of columns of data; and (3) a quantity of columns in the plurality of columns of data.

The information about the correlation between the columns in the plurality of columns of data includes at least one of an average value of coefficients of the correlation between the columns in the plurality of columns of data and a maximum value of the coefficients of the correlation between the columns in the plurality of columns of data. The quantity of different values in each column, the information about correlation between the columns, and the quantity of columns in the plurality of columns of data are extracted, so that even in a scenario in which distribution skew or high correlation occurs in the plurality of columns of data, the distribution characteristic of the plurality of columns of data can be accurately represented. This helps accurately select an appropriate cardinality estimation model, and can improve accuracy of cardinality estimation.

The second feature includes at least one of the following features:

(1) column combination coverage information in the historical query instruction data;

(2) column query range coverage information corresponding to each historical query instruction in the historical query instruction data; and (3) information about a column query similarity between historical query instructions in the historical query instruction data.

The column combination coverage information indicates a ratio of a quantity of existing column combinations in the historical query instruction data to a total quantity of column combinations obtained based on the columns in the analysis instruction.

For example, it is assumed that the historical query instruction data includes "select * from table where $c_1=1$ and $c_2=2$ and $c_3=3$", "select * from table where $c_1=1$ and $c_2=2$", and "select * from table where $c_2=2$ and $c_3=3$". Based on the query condition of each historical query instruction in the historical query instruction data, it can be learned that a quantity of existing column combinations in the historical query instruction data is 3, where the three column combinations are $\{c_1, c_2, \text{and } c_3\}$, $\{c_1, c_2\}$, and $\{c_2, c_3\}$, respectively. If the analysis instruction is, for example, "Analyze($c_1$, $c_2$, $c_3$, $c_4$)", there are 11 possible column combinations: $\{c_1, c_2\}$, $\{c_1, c_3\}$, $\{c_1, c_4\}$, $\{c_2, c_3\}$, $\{c_2, c_4\}$, $\{c_3, c_4\}$, $\{c_1, c_2, c_3\}$, $\{c_1, c_2, c_4\}$, $\{c_2, c_3, c_4\}$, $\{c_1, c_3, c_4\}$, and $\{c_1, c_2, c_3, c_4\}$. The column combination coverage information that is in the historical query instruction data and that is obtained through calculation is $3/11$.

The column query range coverage information corresponding to the historical query instruction indicates a ratio of a column query range of the historical query instruction to a total column query range corresponding to each column in the historical query instruction, and the total column query range corresponding to each column is determined based on a maximum value and a minimum value of values in each column.

For example, if a query condition in a specific historical query instruction in the historical query instruction data is "WHERE $1<=c_1<=3$ and $1<=c_2<=5$ and $2<=c_3<=10$", a column query range of the historical query instruction is $2*4*8=64$. If a minimum value and a maximum value of values in each of the three columns (that is, $c_1$, $c_2$, and $c_3$) are 0 and 100, respectively, a query range of each of the three columns is 0 to 100, a total column query range corresponding to the three columns is $100*100*100=10^6$, and column query range coverage information that corresponds to the historical query instruction and that is obtained through calculation is $64/10^6$.

The information about the column query similarity indicates a similarity between column query ranges in any two historical query instructions.

For example, it is assumed that a query condition in the historical query instruction 1 is "WHERE $1<=c_1<=3$ and $1<=c_2<=5$ and $2<=c_3<=10$", and the query condition is denoted as a vector 1[1, 3, 1, 5, 2, 10]; and it is assumed that a query condition in a historical query instruction 2 is "WHERE $1<=c_1<=6$ and $2<=c_2<=7$", and the query condition is denoted as a vector 2[1, 6, 2, 7, 0, 0]. In this case, a Euclidean distance between the vector 1 and the vector 2 is calculated as x1E8, where the Euclidean distance may be used to represent a similarity between column query ranges in the historical query instruction 1 and the historical query instruction 2. Therefore, the Euclidean distance is used as the information about the column query similarity between the two historical query instructions.

It can be learned that when a feature extraction is performed on the historical query instruction data, a range query is further considered. This enriches application scenarios of cardinality estimation, and helps improve precision of subsequent cardinality estimation.

In this embodiment of this application, the obtaining a cardinality estimation model based on the sample data and a target distribution feature extracted from the sample data includes: selecting a target model type from a plurality of model types based on the target distribution feature extracted from the sample data; and obtaining, based on the target model type and the sample data, a target model corresponding to the target model type.

The plurality of model types include at least two of the following types: a Bayesian network, autoregression (Autoregression, mixed uniform distribution (Mixed Uniform Distribution), a Gaussian kernel function (GKF), a sum-product probability, and a neural network (ANN). It should be noted that, in this embodiment of this application, the plurality of model types are not limited to be merely the foregoing examples, and the model type may alternatively be another type. This is not specifically limited herein.

Further, operators corresponding to the plurality of model types are set in the database, and the obtaining, based on the target model type and the sample data, a target model corresponding to the target model type includes: determining, from the operators corresponding to the plurality of model types, an operator corresponding to the target model type; creating, by using the operator corresponding to the target model type, an untrained model corresponding to the target model type; and training the untrained model based on sample data, to obtain the target model corresponding to the target model type.

An operator corresponding to each model type that is in the operators corresponding to the plurality of model types is a minimum computing unit in the database. For example, the operators corresponding to the plurality of model types include but are not limited to a Bayesian network operator, an autoregressive model operator, a mixed uniform distribution model operator, a Gaussian kernel function model operator, a neural network model operator, a sum-product probability model operator, and the like.

For example, when the target model type is the Bayesian network, the untrained model corresponding to the target model type is an untrained Bayesian network model, and the target model corresponding to the target model type is a Bayesian network model, that is, a trained Bayesian network model. In this case, the Bayesian network model is the foregoing cardinality estimation model.

In other words, the model type of the cardinality estimation model may be determined based on the target distribution feature extracted from the sample data.

For example, the model type of the cardinality estimation model may be indicated via type indication information. The type indication information may indicate the model type of the cardinality estimation model in a bit mapping manner, a binary value manner, or another manner.

Refer to Table 1. Table 1 provides an example of a mapping table between a value of the type indication information and the model type of the cardinality estimation model. It can be learned from Table 1 that when the value of the type indication information is a first value, it indicates that the model type of the cardinality estimation model is the Bayesian network; or when the value of the type indication information is a second value, it indicates that the model type of the cardinality estimation model is autoregression. When the value of the type indication information is a third value, it indicates that the model type of the cardinality estimation model is mixed uniform distribution, . . . . This is not specifically limited herein.

TABLE 1

| Value of the type indication information | Model type of cardinality estimation model |
|---|---|
| First value | Bayesian network |
| Second value | Autoregression |
| Third value | Mixed uniform distribution |
| . . . | . . . |

It may be understood that Table 1 is merely used as an example to reflect a correspondence between the value of the type indication information and the model type of the cardinality estimation model. In actual application, literal content and a storage manner of the correspondence may alternatively be in another form. This is not specifically limited herein.

In a specific implementation, the selecting a target model type from a plurality of model types based on the target distribution feature extracted from the sample data includes: selecting the target model type from the plurality of model types based on the target distribution feature and mapping relationship information, where the mapping relationship information includes a mapping relationship between the plurality of model types and a predicted distribution feature.

The mapping relationship information may be obtained through training according to an artificial intelligence algorithm. For example, the artificial intelligence algorithm may be a decision tree, a random forest (RF), a support vector machine (SVM), or another classification algorithm. This is not specifically limited herein.

For example, the predicted distribution feature includes distribution features corresponding to a plurality of analysis instructions. For example, a distribution feature corresponding to a first analysis instruction is extracted from first sample data collected based on the first analysis instruction. An analysis instruction corresponding to the target distribution feature may be included in the plurality of analysis instructions, or may not be included in the plurality of analysis instructions.

In an implementation, the training sample of the artificial intelligence algorithm may be obtained based on expert experience. A training process of the artificial intelligence algorithm may be, for example: It is assumed that a mapping relationship between a plurality of groups of known distribution features and a plurality of model types is obtained based on expert experience. For example, a distribution feature 1 corresponds to a model type 1. The distribution feature 1 is input into the artificial intelligence algorithm for classification, to obtain an output result. A parameter of the artificial intelligence algorithm is adjusted based on a simulation error between the output result and the type of the model type 1. In this way, after training of a large quantity of training samples, a trained artificial intelligence algorithm can accurately output, based on an input distribution feature, a model type corresponding to the distribution feature. Therefore, in an application process of the artificial intelligence algorithm, when the extracted distribution feature is input into the artificial intelligence algorithm, the artificial intelligence algorithm may select a proper target model type for the distribution feature from a plurality of model types based on a learned mapping relationship between a predicted distribution feature and a predicted model type. In other words, the artificial intelligence algorithm may output the foregoing type indication information.

In addition, a method for extracting a distribution feature from a training sample used for artificial intelligence algorithm training may be as follows: A plurality of analysis instructions are first obtained based on expert experience, and a distribution feature corresponding to each analysis instruction is extracted, based on the analysis instruction, from a historical query record and data sampled from at least one data table in the database. Similarly, for specific content in the distribution feature corresponding to the analysis instruction, refer to the specific content of the first feature and the second feature.

In an implementation, the artificial intelligence algorithm that is used by the coordinator node and that is used to select the target model type may be pre-trained. The training of the artificial intelligence algorithm may not be completed in the coordinator node, that is, a device for using the artificial intelligence algorithm and a device for training the artificial intelligence algorithm may be different devices. For example, the device for using the artificial intelligence algorithm is the first device, and the training device is another device independent of the first device.

Training and use of the artificial intelligence algorithm occur on different devices, respectively. It also indicates that obtaining the mapping relationship information through training of the artificial intelligence algorithm and determining the target model type via the mapping relationship information do not simultaneously occur. Generally, the mapping relationship information is first obtained through training, and then the target model type is determined via the mapping relationship information. In other words, the mapping relationship information obtained through training occurs in past time and space, and the target model type determined via the mapping relationship information occurs in current time and space. In this scenario, another training device undertakes a task of obtaining the mapping relationship information through training, so that load of the first device can be reduced.

In another implementation, the device for using the artificial intelligence algorithm and the device for training the artificial intelligence algorithm may alternatively be a same device. For example, both training and use of the artificial intelligence algorithm are performed on the first device.

In this embodiment of this application, determining of the target model type is related to the target distribution feature.

For example, when the selected model type is the Bayesian network, the target distribution feature extracted from the sample data has a plurality of the following characteristics: a quantity of columns is large (for example, greater than a first threshold), a coefficient of correlation between columns is high (for example, greater than a second threshold), a quantity of different values in each column is even or moderate, a quantity of historical query instructions is small (for example, less than a third threshold), and column combination coverage is small (for example, less than a fourth threshold).

For example, when the selected model type is the Gaussian kernel function, the target distribution feature extracted from the sample data has a plurality of the following characteristics: a quantity of columns is small (for example, less than a fifth threshold), a quantity of historical query instructions is large (for example, greater than a sixth threshold), column combination coverage is high (for example, greater than a seventh threshold), and column query range coverage corresponding to the historical query instruction is high (for example, greater than an eighth threshold).

For example, a process of obtaining the target model corresponding to the target model type is described with reference to FIG. 2. For details, refer to the following B11 to B13.

B11: After the model selection module of the coordinator node determines the target model type, the model creation module of the coordinator node creates, by using an operator that corresponds to the target model type and that is provided by the query executor, an untrained model corresponding to the target model type.

B12: The model creation module determines a model hyper-parameter, so as to select a model hyper-parameter with a fast convergence speed and a small error as much as possible.

Step B12 is optional. In some possible embodiments, the model hyper-parameter may alternatively be set by a user or software by default. This is not specifically limited herein.

The model hyper-parameter may be used to define a model structure or an optimization policy. The model hyper-parameter includes at least one of a gradient descent step, a quantity of layers of a neural network, a learning rate, a quantity of iterations, a batch size, a regularization coefficient, and the like. A method for determining the model hyper-parameter may be a greedy algorithm, a grid search algorithm, an exhaustive search algorithm, or another algorithm. This is not specifically limited herein.

B13: The model creation module trains the untrained model based on the model hyper-parameter through the sample data in S101, to obtain the target model corresponding to the target model type.

Data used during the training of the untrained model corresponding to the target model type is related to the target model type. For example, data used during training of an untrained model is a part of data in the sample data, and data used during training of another untrained model is all data in the sample data.

For example, it can be learned from S101 that the sample data includes the plurality of columns of data corresponding to the analysis instruction and the historical query instruction data corresponding to the analysis instruction. Training the untrained model by using a part of data in the sample data includes the following two cases: (1) when the target model type is any type of the Bayesian network, autoregression, and the sum-product probability, training the untrained model based on the part of data in the sample data, where the part of data in the sample data is the plurality of columns of data corresponding to the analysis instruction; or (2) when the target model type is any type of the foregoing mixed uniform distribution and the Gaussian kernel function, training the untrained model based on the part of data in the sample data, where the part of data in the sample data is the historical query instruction data corresponding to the analysis instruction. Training the untrained model by using all the data in the sample data may be: when the target model type is the neural network, training the untrained model based on all the data in sample data, where all the data in the sample data is the plurality of columns of data corresponding to the analysis instruction and the historical query instruction data corresponding to the analysis instruction, that is, all the data in the sample data.

In an implementation, an end condition for training the untrained model is related to the target model type. For example, when the target model type is the neural network or the sum-product probability, the end condition for training is that an output error of the model gradually stabilizes and reaches a convergence state. For example, when the target model type is any one of the hybrid uniform distribution model, the Bayesian network model, and the Gaussian kernel function, the end condition for training is that input analysis of the training data is completed.

In this embodiment of this application, model meta information may be further obtained. The model meta information includes an identifier of a target model, an identifier of the column in the analysis instruction (that is, an identifier of the column used for constructing the target model), and an identifier of a data table that is in the analysis instruction (that is, an identifier of a data table in which a column used for constructing the target model is located). The model meta information further records a mapping relationship among the identifier of the target model, the identifier of the column in the analysis instruction, and the identifier of the data table that is in the analysis instruction.

In an implementation, the training of the untrained model corresponding to the target model type and use of the target model may occur on a same device, for example, the first device.

In this embodiment of this application, the first device may store the model meta information, for example, store the model meta information in a memory and/or a disk. In some possible embodiments, the first device stores the model meta information in a system statistical table (or referred to as a statistical table) in the database.

In this embodiment of this application, the model parameter of the target model may be stored in a memory and/or a disk of the first device.

In an implementation, the first device stores the model parameter of the target model in a system model table (or referred to as a system table) in the database, where the system model table is located in the disk. Before storing the model parameter of the target model in the system model table, the first device needs to perform serialization processing on the model parameter of the target model.

In some possible embodiments, after obtaining the target model corresponding to the current analysis instruction, the first device may add or update the model parameter of the target model to the system model table. In some possible embodiments, the system model table may also store a parameter of an old model, where the old model is a model parameter that is of the target model and that is obtained by the first device according to a historical analysis instruction. It can be learned from this that in this embodiment of this application, the model parameter of the target model may be managed, updated, and maintained by the database.

In this embodiment of this application, different analysis instructions correspond to different target models. The different target models mean that different analysis instructions correspond to different types of target models, or that different analysis instructions correspond to a same type of target model, but the different analysis instructions correspond to different model parameters of target models. The different analysis instructions mean that quantities of columns in two analysis instructions are different, or identifiers of columns in two analysis instructions are different, or quantities of columns in two analysis instructions are different and identifiers of the columns are also different.

For example, it is assumed that a cardinality estimation model obtained by the coordinator node based on the received analysis instruction 1 after data sampling, model selection, and model creation shown in FIG. 2 is a target model 1, and a cardinality estimation model obtained by the coordinator node based on the received analysis instruction 2 after data sampling, model selection, and model creation shown in FIG. 2 is a target model 2. The analysis instruction 1 is different from the analysis instruction 2. A type of the target model 1 may be different from a type of the target model 2. Alternatively, a type 1 of the target model 1 and a type of the target model 2 may be the same (for example, both are neural networks), but a model parameter of the target model 1 is different from a model parameter of the target model 2 (for example, a weight and an offset value of the neural network).

In some possible embodiments, the first device may receive a same analysis instruction at different moments, and a same analysis instruction received at different moments may correspond to different target models. The analysis instruction may be sent by different clients at different moments, or may be sent by a same client at different moments. This is not specifically limited herein. For example, it is assumed that the first device receives the analysis instruction 1 at a moment 1, and performs, based on the analysis instruction 1, a series of operations such as sample data extraction, feature extraction, model type selection, model creation, and training, to obtain the target model 1, and the first device receives the analysis instruction 1 again at a moment 2. It is assumed that the first device performs, based on the analysis instruction 1, a series of operations such as sample data extraction, sign extraction, model type selection, model creation, and training at this time, to obtain the target model 2. In this case, the target model 2 may be different from the target model 1. Specifically, a type of the target model 2 is different from a type of the target model 1. Alternatively, the target model 2 and the target model 1 are of a same type, but a parameter of the target model 2 is different from a parameter of the target model 1. Although a same analysis instruction is analyzed, the analysis instruction is received at different moments. During a period from the moment 1 to the moment 2, a query instruction of the user may be newly added to the historical query record, and/or data in each column in the data table changes. As a result, sample data extracted based on the analysis instructions at different moments may be different, and further extracted distribution features may also be different. Therefore, finally obtained target models may also be different. It may be understood that when a target model corresponding to a same analysis instruction changes, the first device may update, in the memory and/or the disk, related information (for example, a model parameter and model meta information) of the newly obtained target model corresponding to the analysis instruction, to replace related information of an old target model corresponding to the analysis instruction.

Optionally, in some possible embodiments, the following step may be further performed.

S103: Perform cardinality estimation on a query condition in a query instruction by using the cardinality estimation model, where an obtained cardinality indicates an estimated quantity of rows of an execution result of the query instruction.

In this embodiment of this application, the first device receives the query instruction sent by the client.

The query instruction may be a query for a single table, or may be a query for a plurality of tables. In the query for the single table, records in the data table are filtered based on a WHERE condition to form an intermediate table, and then a query result is returned based on a column selected by SELECT. In the query for the plurality of tables, queries on the first data table and the second data table may be first performed based on a join of the two tables, join query is performed on the third data table by using a query result, . . . , until all data tables are joined to form an intermediate table, records in the intermediate table are filtered based on the WHERE condition, and a query result is returned based on the column specified by SELECT.

The query instruction includes a query condition, and the query condition may be obtained according to WHERE in the query instruction. The query condition in the query instruction includes a predicate and identifier information of a column, the predicate in the query condition includes at least one of like, between, is NULL/is NOT NULL, in, exists, and a comparison operator, where like is used for a partial consistency query of a character string or referred to as a fuzzy query; between is used for a range query; is NULL/is NOT NULL is used to determine a null value, to be specific, is NULL is used to select data in a column whose value is NULL (null) and is NOT NULL is used to select data in a column whose value is NOT NULL (non null); in is used to search for data whose attribute value belongs to a specified set; exists is used to determine whether there is a record that meets a specific condition; and the comparison operator is used to compare sizes.

To improve query efficiency of the query instruction, before executing the query instruction, the first device may perform cardinality estimation on the query instruction by using the cardinality estimation model.

In a specific implementation, with reference to FIG. 2, the execution plan generation module in the query optimizer obtains a plurality of candidate execution plans based on the query condition in the query instruction, and the intelligent cardinality estimation module performs cardinality estimation on each candidate execution plan by using the cardinality estimation model. Therefore, each candidate execution plan has a corresponding estimated cardinality. In some possible embodiments, the execution plan selection module may select an optimal execution plan from the plurality of candidate execution plans based on cardinality estimation results of the plurality of candidate execution plans, and output the optimal execution plan to the query executor, so that the query executor executes the query instruction based on the optimal execution plan.

In a specific implementation, cardinality estimation of one execution plan is used as an example. Before performing cardinality estimation, the first device needs to: first determine, based on the obtained model meta information, a target model matching the execution plan, then obtain a model parameter of the target model from the memory or the disk, and finally perform cardinality estimation on the execution plan by using the model parameter of the target model.

Further, the target model matching the execution plan may be determined based on a maximum quantity of columns in the execution plan that are the same as columns in each target model in the model meta information.

For example, it is assumed that the model meta information includes two mapping relationships, where one mapping relationship is: an identifier of columns in a target model 1-analysis instruction is {c1, c2, c3, c4}, and the other mapping relationship is: an identifier of columns in a target model 2-analysis instruction is {c2, c5, c6}. It is assumed that an identifier of columns involved in an execution plan 1 is {c1, c2, c3}, and an identifier of columns involved in an execution plan 2 is {c2, c5, c6}. For the execution plan 1, the execution plan 1 is compared with the target model 1 to obtain a same column {c1, c2, c3}, and the execution plan 1 is compared with the target model 2 to obtain a same column {c2}. Therefore, a target model matching the execution plan 1 is the target model 1. For the execution plan 2, the execution plan 2 is compared with the target model 1 to obtain a same column {c2}, and the execution plan 2 is compared with the target model 2 to obtain a same column {c2, c5, c6}. Therefore, a target model matching the execution plan 2 is the target model 2. In conclusion, cardinality estimation is performed on the execution plan 1 by using the target model 1, and cardinality estimation is performed on the execution plan 2 by using the target model 2.

In this embodiment of this application, after determining the target model based on the model meta information, the first device may obtain an identifier of the target model. Further, the first device needs to obtain a model parameter of the target model based on the identifier of the target model.

In an implementation, the first device may directly read the model parameter of the target model from the memory based on the identifier of the target model. In this way, frequent deserialization operations caused by reading the model parameter from the disk can be avoided, thereby helping improve efficiency of cardinality estimation.

In another implementation, when the first device fails to read the model parameter of the target model from the memory of the first device based on the identifier of the target model, the first device reads the model parameter of the target model from the disk, for example, reads the model parameter of the target model from a system model table of the disk, and performs deserialization processing on the read model parameter of the target model, to restore the model parameter of the target model. It may be understood that the model parameter of the target model is a parameter of the cardinality estimation model.

In some possible embodiments, each time the first device obtains a model parameter of a target model from the disk, the first device stores the model parameter of the target model in the memory, so that the model parameter of the target model can be directly obtained from the memory when the same model parameter of the target model is read next time. In this way, frequent deserialization operations caused by reading the model parameter from the disk are avoided, and this is equivalent to implementing pre-reading of the model parameter. Efficiency of reading the target model parameter is effectively improved.

However, storage space in the memory is limited, and a quantity of target models that store model parameters in the memory is also limited. In addition, the quantity of target models that store model parameters in the memory is less than a quantity of target models that store model parameters in a disk. To improve efficiency of reading the model parameter, model parameters of some target models in the memory may be deleted periodically or when the memory is full. For example, model parameters of one third of a total quantity of target models in the memory are deleted. In this way, the model parameter of the to-be-called target model can be directly obtained from the memory as much as possible, or the model parameter of the to-be-called target model can be further stored in the memory after being read from the disk.

For example, it is assumed that the memory can store model parameters of a maximum of 60 target models. As time goes by, the memory is fully stored with the model parameters of the 60 target models. However, it is found in a use process that: Model parameters of some to-be-called target models are not in the memory and need to be read from the disk, and some model parameters of the target models are not accessed for a long time in the memory. In this case, a model parameter of a corresponding target model in the memory may be deleted to increase available storage space of the memory. For example, the deleted target model meets the following condition: an interval between a time of last accessing the model parameter of the target model and a current time is greater than preset duration.

It can be learned that in this embodiment of this application, a type of a to-be-constructed model used for cardinality estimation is determined by using an extracted distribution feature, and an operator that corresponds to the type and that is set in the database is used to construct the model. This not only improves accuracy of the constructed model, but also helps improve efficiency of cardinality estimation. Security of the database is ensured, and it is convenient for the database to manage and maintain related information of the model used for cardinality estimation. In addition, a plurality of features are extracted for the plurality of columns of data corresponding to the analysis instruction and the historical query instruction data, so that an appropriate model type can be more accurately selected for different scenarios, application scenarios of cardinality estimation are enriched, and accuracy of cardinality estimation is improved.

FIG. 4 is a flowchart of another cardinality estimation method according to an embodiment of this application. The method is applied to a first device. The first device may be the coordinator node in FIG. 1. For specific composition of the coordinator node, refer to related descriptions in FIG. 2. Details are not described herein. The method includes but is not limited to the following steps.

S201: Select a target model type from a plurality of model types based on a target distribution feature and mapping relationship information, where the mapping relationship information includes a mapping relationship between the plurality of model types and a predicted distribution feature, and the target distribution feature is extracted from sample data collected based on an analysis instruction.

In a specific implementation, the sample data is collected from a historical query record and at least one data table in a database based on the analysis instruction.

In a specific implementation, the sample data includes a plurality of columns of data corresponding to the analysis instruction and historical query instruction data corresponding to the analysis instruction. For example, the plurality of columns of data corresponding to the analysis instruction are collected from the at least one data table in the database based on the columns in the analysis instruction, and the historical query instruction data corresponding to the analysis instruction is collected from the historical query record based on the columns in the analysis instruction.

Further, the target distribution feature includes a first feature and a second feature, where the first feature indicates a distribution characteristic of the plurality of columns of data corresponding to the analysis instruction, and the second feature indicates a distribution characteristic of columns in historical query instruction data corresponding to the analysis instruction. It may be understood that the first feature is extracted from the plurality of columns of data corresponding to the analysis instruction, and the second feature is extracted from the historical query instruction data corresponding to the analysis instruction.

In a specific implementation, the first feature includes at least one of the following features: a quantity of different values in each of the plurality of columns of data; information about correlation between columns in the plurality of columns of data; and a quantity of columns of the plurality of columns of data. For specific content of the first feature, refer to related descriptions of the first feature in S102 in the embodiment in FIG. 3. Details are not described herein.

In a specific implementation, the second feature includes at least one of the following features: column combination coverage information in the historical query instruction data; column query range coverage information corresponding to each historical query instruction in the historical query instruction data; and information about a column query similarity between historical query instructions in the historical query instruction data. For specific content of the second feature, refer to related descriptions of the second feature in S102 in the embodiment in FIG. 3. Details are not described herein.

In a specific implementation, when the analysis instruction includes identifiers of a plurality of data tables in the database, a process of collecting the sample data is specifically as follows: sending sampling indication information to at least one data node, where the sampling indication information indicates the at least one data node to collect, from the plurality of data tables based on a join relationship between the plurality of data tables, data in a column in the analysis instruction; and collecting a historical query instruction that is in the historical query record and that is related to the column in the analysis instruction. For the process of collecting the sample data, refer to related descriptions of sample data collection in the embodiment in FIG. 3.

In a specific implementation, the mapping relationship information may be obtained through training according to an artificial intelligence algorithm.

In a specific implementation, the plurality of model types include at least two of the following types: a Bayesian network, autoregression, mixed uniform distribution, a Gaussian kernel function, a sum-product probability, and a neural network.

S202: Obtain, based on the target model type, a target model corresponding to the target model type, where the target model is used to perform cardinality estimation on a query instruction of a database.

In a specific implementation, the obtaining, based on the target model type, a target model corresponding to the target model type includes: obtaining, based on the target model type and the sample data, the target model corresponding to the target model type.

In a specific implementation, operators corresponding to the plurality of model types are set in the database, and the obtaining, based on the target model type and the sample data, a target model corresponding to the target model type includes: determining, from the operators corresponding to the plurality of model types, an operator corresponding to the target model type; creating, by using the operator corresponding to the target model type, an untrained model corresponding to the target model type; and training the untrained model based on sample data, to obtain the target model corresponding to the target model type. It should be noted that the target model is the cardinality estimation model obtained in S102 in the embodiment in FIG. 3. For a specific process of obtaining the target model, refer to descriptions of corresponding content in S102. Details are not described herein.

In a specific implementation, a model parameter of the target model is stored in a memory and/or a disk.

In a specific implementation, the target model may be further used to perform cardinality estimation on the received query instruction. For a specific process, refer to related descriptions of S103 in the embodiment in FIG. 3. Details are not described herein.

It can be learned that in this embodiment of this application, a type of a to-be-constructed model used for cardinality estimation is first determined through an extracted distribution feature, and the model used for cardinality estimation is constructed based on the determined type of the model. This not only improves accuracy of the constructed model, but also helps improve accuracy of cardinality estimation. In addition, the distribution feature is extracted from a plurality of dimensions such as a value of column data, a correlation, a quantity of columns, and a query range corresponding to historical query load. This increases diversity of the distribution feature, can more accurately select a proper model type for different scenarios, and enriches application scenarios of cardinality estimation.

FIG. 5 is a diagram of a structure of a cardinality estimation apparatus according to an embodiment of this application. The cardinality estimation apparatus 30 includes a type selection unit 310 and a model establishment unit 312. The cardinality estimation apparatus 30 may be implemented by hardware, software, or a combination of software and hardware.

The type selection unit 310 is configured to select a target model type from a plurality of model types based on a target distribution feature and mapping relationship information, where the mapping relationship information includes a mapping relationship between the plurality of model types and a predicted distribution feature, the target distribution feature is extracted from sample data collected based on an analysis instruction. The model establishment unit 312 is configured to obtain, based on the target model type, a target model corresponding to the target model type, where the target model is used to perform cardinality estimation on a query instruction of a database.

In some possible embodiments, the cardinality estimation apparatus 30 further includes a data collection unit (not shown in the figure), and the data collection unit is configured to collect the sample data. For example, when the analysis instruction includes identifiers of a plurality of data tables in the database, the data collection unit is specifically configured to: send sampling indication information to at least one data node, where the sampling indication information indicates the at least one data node to collect, from the plurality of data tables based on a join relationship between the plurality of data tables, data in a column in the analysis instruction; and collect a historical query instruction that is in a historical query record and that is related to the column in the analysis instruction.

The cardinality estimation apparatus 30 may be configured to implement the method described in the embodiment of FIG. 4. In the embodiment in FIG. 4, the type selection unit 310 may be configured to perform S201, and the model establishment unit 312 may be configured to perform S202. The cardinality estimation apparatus 30 may be further configured to implement the method described in the embodiment in FIG. 3. For brevity of the specification, details are not described herein.

One or more of the units in the embodiment shown in FIG. 5 may be implemented by software, hardware, firmware, or a combination thereof. The software or firmware includes but is not limited to computer program instructions or code, and may be executed by a hardware processor. The hardware includes but is not limited to various integrated circuits, such as a central processing unit (CPU), a digital signal processor (DSP), a field programmable gate array (FPGA), or an application-specific integrated circuit (ASIC).

Figure 6:
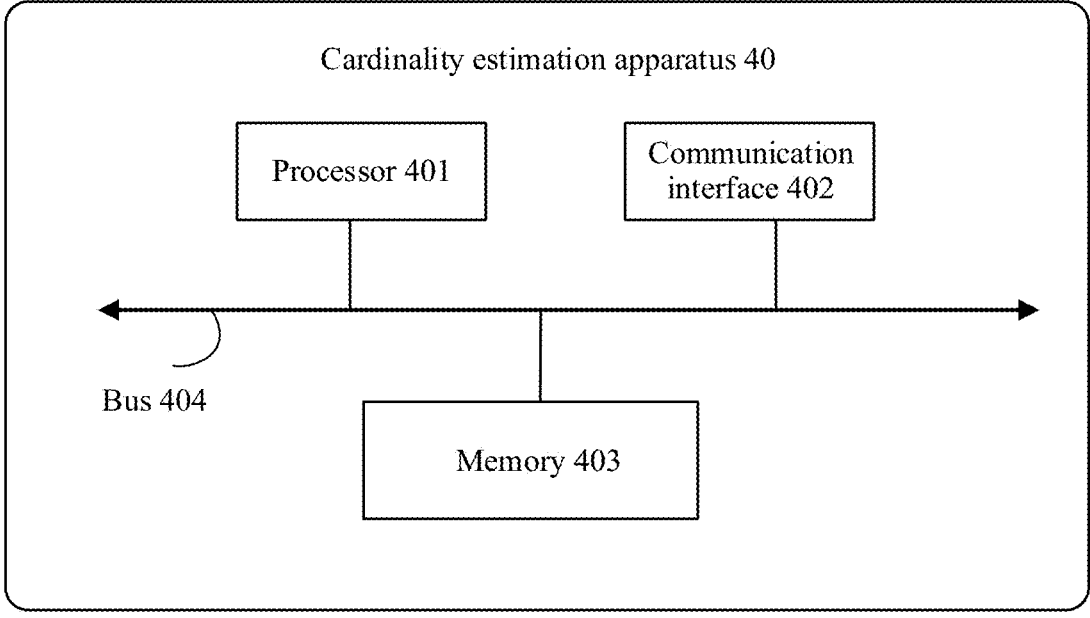
FIG. 6 is a diagram of a structure of another cardinality estimation apparatus according to an embodiment of this application.

FIG. 6 is a diagram of a structure of another cardinality estimation apparatus according to an embodiment of this application.

In FIG. 6, the cardinality estimation apparatus 40 includes a processor 401, a communication interface 402, a memory 403, and a bus 404. The processor 401, the memory 403, and the communication interface 402 communicate with each other by using the bus 404. It should be understood that quantities of processors and memories in the cardinality estimation apparatus 40 are not limited in this application.

The cardinality estimation apparatus 40 may be the coordinator node in FIG. 1, or the first device in the embodiment shown in FIG. 3.

The bus 404 may be a peripheral component interconnect (PCI) bus or an extended industry standard architecture (EISA) bus, or the like. The bus may be classified into an address bus, a data bus, a control bus, and the like. For ease of representation, only one line is used for representation in FIG. 6, but this does not mean that there is only one bus or only one type of bus. The bus 404 may include a path for transmitting information between components (such as, the memory 403, the processor 401, and the communication interface 402) of the cardinality estimation apparatus 40.

The processor 401 may include any one or more of processors such as a central processing unit (CPU), a microprocessor (MP), or a digital signal processor (DSP).

The memory 403 is configured to provide storage space, and the storage space may store data, for example, an operating system and a computer program. The memory 403 may be one or a combination of a random access memory (RAM), an erasable programmable read-only memory (EPROM), a read-only memory (ROM), a compact disc read-only memory (CD-ROM), or the like. The memory 403 may exist independently, or may be integrated into the processor 401.

The communication interface 402 may be configured to provide an information input or output for the processor 401. Alternatively, the communication interface 402 may be configured to receive data sent from the outside and/or send data to the outside, and may be a wired link interface including an Ethernet cable, or may be a wireless link (for example, Wi-Fi, Bluetooth, or universal wireless transmission) interface. Alternatively, the communication interface 402 may further include a transmitter (for example, a radio frequency transmitter or an antenna), a receiver, or the like coupled to the interface.

The processor 401 in the cardinality estimation apparatus 40 is configured to read the computer program stored in the memory 403, and is configured to perform the foregoing method, for example, the method described in FIG. 3 or FIG. 4.

In a possible design manner, the cardinality estimation apparatus 40 may be one or more modules in an execution body of the method shown in FIG. 3 or FIG. 4. The processor 401 may be configured to read one or more computer programs stored in the memory, to perform the following operations.

The type selection unit 310 selects a target model type from a plurality of model types based on a target distribution feature and mapping relationship information, where the mapping relationship information includes a mapping relationship between the plurality of model types and a predicted distribution feature, and the target distribution feature is extracted from sample data collected based on an analysis instruction.

The model establishment unit 312 obtains, based on the target model type, a target model corresponding to the target model type, where the target model is used to perform cardinality estimation on a query instruction of the database.

In the foregoing embodiments in this specification, the descriptions of each embodiment have respective focuses. For a part that is not described in detail in an embodiment, refer to related descriptions in another embodiment.

It should be noted that a person of ordinary skill in the art may see that, all or a part of the steps in each method of the foregoing embodiments may be implemented by a program instructing related hardware. The program may be stored in a computer-readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory, (EEPROM), a compact disc read-only memory (CD-ROM), or another optical disk memory, magnetic disk memory, magnetic tape memory, or any other computer-readable medium that can be configured to carry or store data.

The technical solutions of this application essentially, or the part contributing to the conventional technology, or all or some of the technical solutions may be implemented in a form of a software product. A computer program product is stored in a storage medium and includes several instructions for instructing a device (which may be a personal computer, a server, or a network device, a robot, a single-chip micro-computer, a chip, a robot, or the like) to perform all or some of the steps of the methods described in embodiments of this application.

The invention claimed is:

1. A method implemented by a cardinality estimation apparatus, comprising:
   obtaining, based on an analysis instruction, sample data from a historical query record and from at least one data table in a database, wherein the historical query record includes a plurality of historical query instructions;
   extracting a target distribution feature from the sample data;
   selecting a target model type from a plurality of model types based on the target distribution feature and mapping relationship information, wherein the mapping relationship information comprises a mapping relationship between the plurality of model types and a predicted distribution feature;
   obtaining, based on the target model type, a target model corresponding to the target model type;
   generating a plurality of candidate execution plans according to a query instruction;
   executing on each candidate execution plan among the plurality of candidate execution plans a cardinality estimation based on the target model;
   selecting an optimal execution plan from the plurality of candidate execution plans based on a result of the cardinality estimation of each candidate execution plan; and
   executing the query instruction based on the optimal execution plan.

2. The method according to claim 1, wherein the obtaining, based on the target model type, the target model corresponding to the target model type comprises:
   obtaining, based on the target model type and the sample data, the target model corresponding to the target model type.

3. The method according to claim 2, wherein operators corresponding to the plurality of model types are set in the database, and the obtaining, based on the target model type and the sample data, the target model corresponding to the target model type comprises:
   determining, from the operators corresponding to the plurality of model types, an operator corresponding to the target model type;
   creating, by using the operator corresponding to the target model type, an untrained model corresponding to the target model type; and
   training the untrained model based on the sample data, to obtain the target model corresponding to the target model type.

4. The method according to claim 1, wherein the sample data comprises a plurality of columns of data corresponding to the analysis instruction and historical query instruction data corresponding to the analysis instruction, and the target distribution feature comprises a first feature and a second feature, and wherein the first feature indicates a distribution characteristic of the plurality of columns of data, and the second feature indicates a distribution characteristic of columns in the historical query instruction data.

5. The method according to claim 4, wherein the first feature comprises at least one of the following features:
   a quantity of different values in each of the plurality of columns of data,
information about correlation between columns in the plurality of columns of data, or
a quantity of columns in the plurality of columns of data.

6. The method according to claim 4, wherein the second feature comprises at least one of the following features:
   column combination coverage information in the historical query instruction data;
column query range coverage information corresponding to each historical query instruction in the historical query instruction data, or information about a column query similarity between historical query instructions in the historical query instruction data.

7. The method according to claim 1, wherein when the analysis instruction comprises identifiers of a plurality of data tables in the database, a process of collecting the sample data is specifically as follows:
   sending sampling indication information to at least one data node, wherein the sampling indication information indicates the at least one data node to collect, from the plurality of data tables based on a join relationship between the plurality of data tables, data in a column in the analysis instruction; and
   collecting a historical query instruction that is in the historical query record and that is related to the column in the analysis instruction.

8. The method according to claim 1, wherein the mapping relationship information is obtained through training according to an artificial intelligence algorithm.

9. The method according to claim 1, wherein a model parameter of the target model is stored in a memory and/or a disk.

10. The method according to claim 1, wherein the plurality of model types comprises at least two of the following types:
   a Bayesian network, autoregression, mixed uniform distribution, a Gaussian kernel function, a sum-product probability, or a neural network.

11. A cardinality estimation apparatus, comprising:
   a memory;
   one or more processors coupled to the memory, wherein the one or more processors are configured to:

obtain, based on an analysis instruction, sample data from a historical query record and from at least one data table in a database, wherein the historical query record includes a plurality of historical query instructions;

extract a target distribution feature from the sample data;

select a target model type from a plurality of model types based on the target distribution feature and mapping relationship information, wherein the mapping relationship information comprises a mapping relationship between the plurality of model types and a predicted distribution feature;

obtain, based on the target model type, a target model corresponding to the target model type;

generate a plurality of candidate execution plans according to a query instruction;

execute on each candidate execution plan among the plurality of candidate execution plans a cardinality estimation based on the target model;

select an optimal execution plan from the plurality of candidate execution plans based on a result of the cardinality estimation of each candidate execution plan; and execute the query instruction based on the optimal execution plan.

12. The apparatus according to claim 11, wherein the one or more processors are further configured to:

obtain, based on the target model type and the sample data, the target model corresponding to the target model type.

13. The apparatus according to claim 11, wherein operators corresponding to the plurality of model types are set in the database, and the model establishment unit is specifically configured to:

determine, from the operators corresponding to the plurality of model types, an operator corresponding to the target model type;

create, by using the operator corresponding to the target model type, an untrained model corresponding to the target model type; and train the untrained model based on the sample data, to obtain the target model corresponding to the target model type.

14. The apparatus according to claim 11, wherein the sample data comprises a plurality of columns of data corresponding to the analysis instruction and historical query instruction data corresponding to the analysis instruction, and the target distribution feature comprises a first feature and a second feature, wherein the first feature indicates a distribution characteristic of the plurality of columns of data, and the second feature indicates a distribution characteristic of columns in the historical query instruction data.

15. The apparatus according to claim 14, wherein the first feature comprises at least one of the following features:

a quantity of different values in each of the plurality of columns of data, information about correlation between columns in the plurality of columns of data, or a quantity of columns in the plurality of columns of data.

16. The apparatus according to claim 14, wherein the second feature comprises at least one of the following features:

column combination coverage information in the historical query instruction data, column query range coverage information corresponding to each historical query instruction in the historical query instruction data, or information about a column query similarity between historical query instructions in the historical query instruction data.

17. A non-transitory computer-readable storage medium storing program instructions, that when executed by one or more processors, cause the one or more processors to:

obtain, based on an analysis instruction, sample data from a historical query record and from at least one data table in a database, wherein the historical query record includes a plurality of historical query instructions;

extract a target distribution feature from the sample data;

select a target model type from a plurality of model types based on the target distribution feature and mapping relationship information, wherein the mapping relationship information comprises a mapping relationship between the plurality of model types and a predicted distribution feature;

obtain, based on the target model type, a target model corresponding to the target model type;

generate a plurality of candidate execution plans according to a query instruction;

execute on each candidate execution plan among the plurality of candidate execution plans a cardinality estimation based on the target model;

select an optimal execution plan from the plurality of candidate execution plans based on a result of the cardinality estimation of each candidate execution plan; and execute the query instruction based on the optimal execution plan.

18. The non-transitory computer-readable storage medium according to claim 17, wherein the target model corresponding to the target model type is obtained based on the target model type and the sample data.

* * * * *